No. 890,654. PATENTED JUNE 16, 1908.
R. HUFF.
MOTOR VEHICLE.
APPLICATION FILED OCT. 21, 1907.

2 SHEETS—SHEET 1.

Witnesses
J. G. Hinkel
J. J. McCarthy

Inventor
Russell Huff
By Foster, Freeman, Watson & Coit
Attorneys

No. 890,654. PATENTED JUNE 16, 1908.
R. HUFF.
MOTOR VEHICLE.
APPLICATION FILED OCT. 21, 1907.
2 SHEETS—SHEET 2.
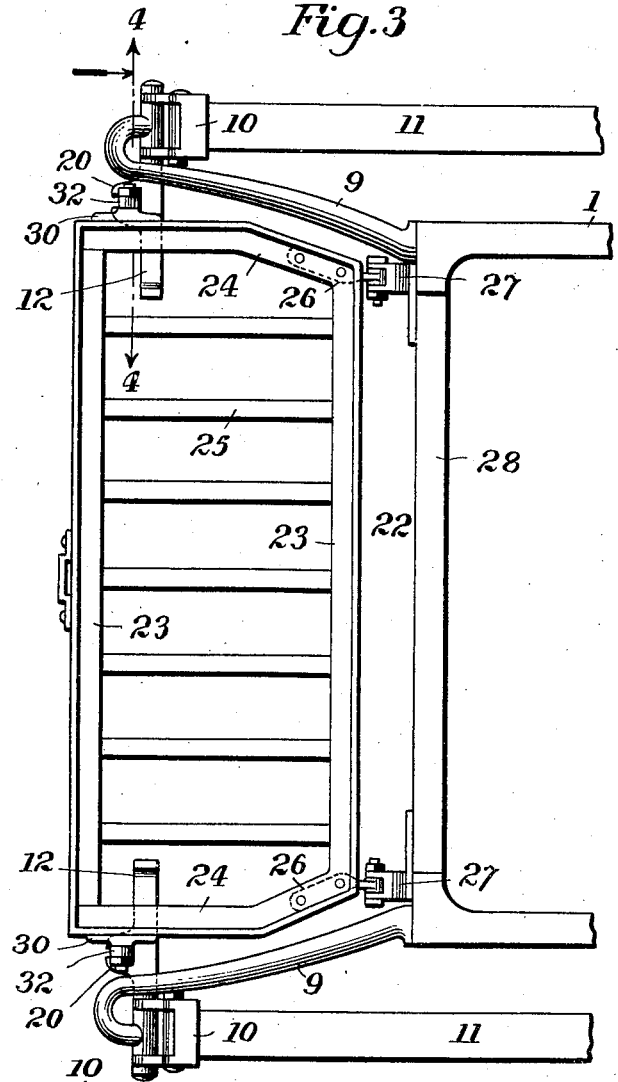
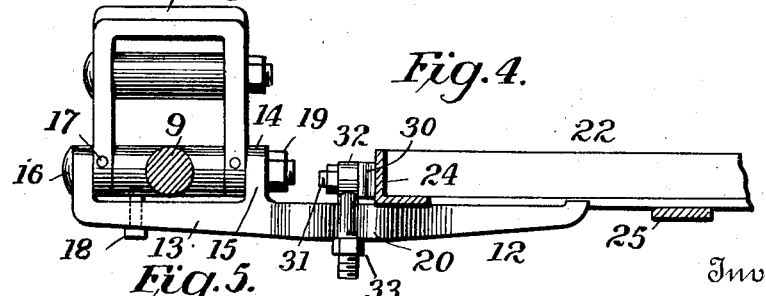

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE.

No. 890,654.   Specification of Letters Patent.   Patented June 16, 1908.

Application filed October 21, 1907. Serial No. 398,451.

*To all whom it may concern:*

Be it known that I, RUSSELL HUFF, a citizen of the United States, residing at Detroit, Wayne county, in the State of Michigan, have invented certain new and useful Improvements in Motor-Vehicles, of which the following is a specification.

The present invention relates to motor vehicle construction, and particularly to baggage racks adapted to be attached to the rear portion of such vehicles.

It is particularly designed for use on motor vehicles of the runabout type in which a tiger seat is carried on the extreme rear portion, and in which steps are provided on both sides of the frame of the vehicle for the purpose of facilitating reaching said seat. It is to be understood however that the invention is not limited to this particular use, and that its features of construction are applicable to other types of motor vehicle.

The objects and advantages of the invention will be apparent from the following description.

Figure 1:
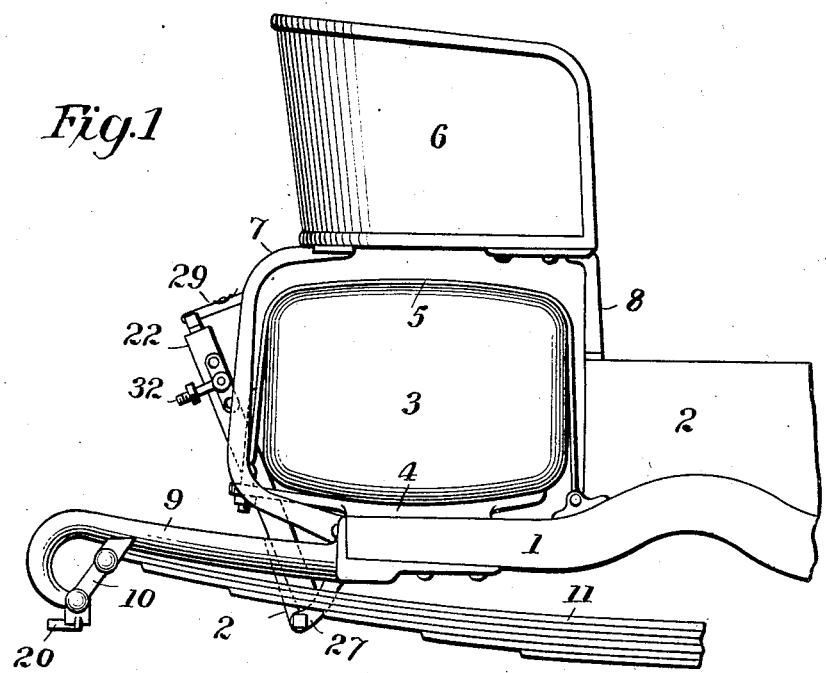
Figure 2:
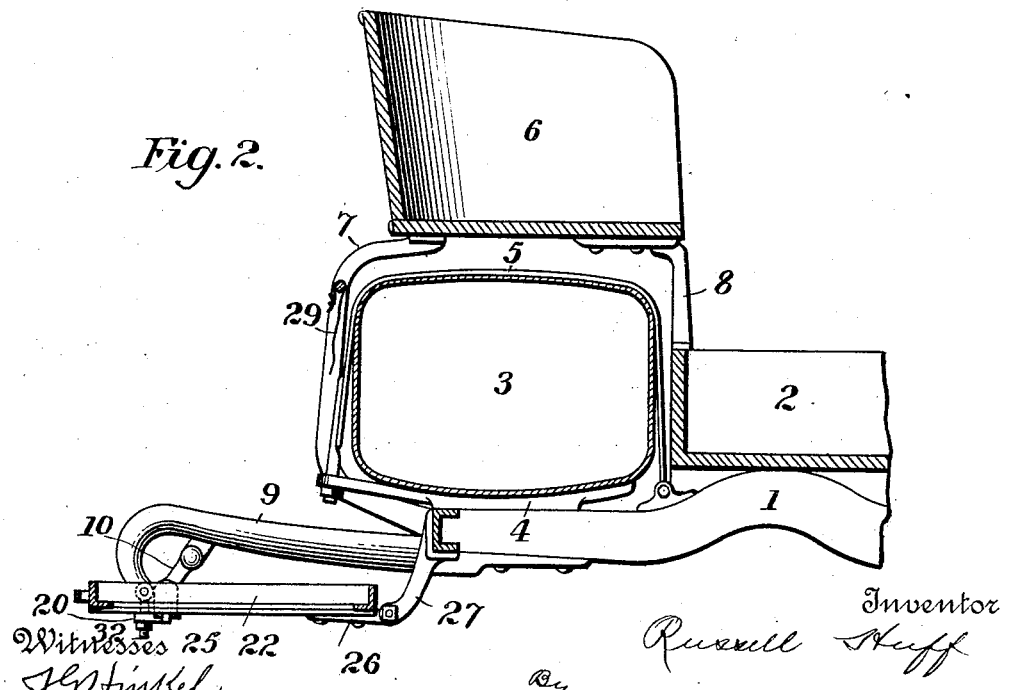

In the accompanying drawings—Figure 1 is a side elevation of the rear portion of the motor vehicle embodying the invention, the baggage rack being shown in its elevated position; Fig. 2 is a sectional view of what is shown in Fig. 1, the baggage rack in this instance being shown in its lowered position; Fig. 3 is a plan view of the baggage rack and contiguous parts of the vehicle; Fig. 4 is an enlarged elevation of one of the steps which support the baggage rack, showing part of that rack in section; and Fig. 5 is a plan view of the step disconnected from its attached parts.

Referring to the drawings 1 represents the rear portion of the vehicle frame and 2 the body supported thereon.

3 is a gasolene tank supported on the rear portion of the frame 1 on brackets 4 and held in position by straps 5. Above said tank is supported the tiger seat 6 on brackets 7 and 8 mounted on the frame and body respectively. Extending rearwardly from each side of the frame is a suitably curved spring hanger 9, the end of which is connected by a shackle 10 with the end of the rear spring 11. The above are of well known design and construction and need not be further described.

There is hung from the ends of each spring hanger 9 a bracket or step 12 of any suitable form, the one shown having a straight body portion 13 and on one end thereof two upwardly extending spaced ears 14 provided with eyes 15 through which the bolt 16 connecting the hanger with the shackle passes. These brackets extend inwardly from the springhanger and in the runabout type of vehicle are made in the form of steps so that they may be used as a means for enabling the occupant of the vehicle to reach the tiger seat. In the present instance the bolt 16 which connects the hanger to the shackle is keyed by means of pins 17 to the shackle, and the step is keyed by means of bolt 18 to the hanger, as will be clearly seen by reference to Fig. 4. The key connection between the shackle and the bolt makes those parts move together and consequently the bolt turns in the long bearing surface in the end of the hanger, and furthermore the bolt is prevented from working loose and being lost. A nut 19 on the end of the bolt acts as an additional means for holding it in place.

The key connection between the step and the spring hanger made by means of the bolt 18 serves to keep the step in a fixed relation to the body of the vehicle and in a substantially horizontal position. The step 12 is further provided at a point between its ends with two laterally extending spaced lugs 20 providing a notch 21 between them for a purpose hereinafter specified. The steps 12 on each side of the vehicle are identical, and therefore the above description of one of them will suffice for both.

The baggage rack 22 is composed of longitudinal angle iron side pieces 23, angle iron end pieces 24, and intermediate transversely extending spaced straps 25, all of which are riveted together to form a rigid steel frame suitable for supporting a trunk or baggage of any description. This rack is provided at one side with hinge pieces 26 by which it is pivotally connected to brackets 27 attached to the rear cross beam 28 of the vehicle frame. By this connection the rack may be held in the folded position shown in full lines in Fig. 1 against the rear portion of the vehicle by a strap 29, or it may be dropped to the lowered position shown in Fig. 2, in which position the end portions of the rack rest upon the steps 12 hereinbefore described. Mounted on each of the end pieces 24 is a bracket 30 provided with a horizontally extending pivot pin 31 from which is suspended an eye bolt 32 provided with a nut 33. When the rack is in its lowered position as shown in Fig. 2, in plan in Fig. 3 and in section in Fig. 4, the said bolt 32 is adapted to enter the notch 21 between the lugs 20 of the steps, and upon tightening the nut 33 the rack is rigidly secured to the step whereby it is securely held in its lowered position.

Having described my invention, what I claim and desire to secure by Letters Patent is—

1. In a motor vehicle, the combination with the frame, of a baggage rack pivotally attached to the rear part thereof, and steps attached to the spring hangers for supporting said rack.

2. In a motor vehicle, the combination with the frame, of a baggage rack pivotally attached to the rear part thereof, steps attached to the spring hangers for supporting said rack, and means for clamping said rack to the steps to hold it in position.

3. In a motor vehicle, the combination with the frame, of a baggage rack pivotally attached to the rear part thereof, and steps attached to the spring hangers for supporting said rack, said steps being provided with side notches and pivoted bolts on said rack adapted to fit in said notches and clamp the parts in position.

4. In a motor vehicle, the combination with the frame, of a baggage rack pivotally supported between the spring hangers of the frame, and steps extending horizontally inward from the ends of the hangers whereby the rack can be raised on its pivotal support up against a part of the vehicle and will rest on the steps when in its lowered position.

5. A step for the rear spring hanger of motor vehicles comprising a main body portion, spaced upwardly extending ears thereon provided with eyes to receive the pin of the spring hanger, and a bolt adapted to engage the hanger and key the step thereto.

6. A step for the rear spring hanger of motor vehicles, comprising a main body portion having a notch in one side, spaced upwardly extending ears thereon near one end provided with eyes to receive the pin of the spring hanger, and a bolt adapted to engage the hanger and key the step thereto.

7. In a motor vehicle, the combination with the rear spring hanger, of a shackle for connecting its end with the end of the spring, a bolt passing through said hanger and shackle, means for keying said bolt to the shackle, a step having spaced ears provided with eyes through which said bolt passes, and a bolt for keying said step to the hanger to maintain it in a horizontal position.

8. In a motor vehicle, the combination with the frame, of a baggage rack pivotally attached to the rear part thereof, and brackets attached to the spring hangers for supporting said rack.

In testimony whereof I affix my signature in presence of two witnesses.

RUSSELL HUFF.

Witnesses:
MILTON TIBBETTS,
CLARA I. DALE.